(12) United States Patent
Ham et al.

(10) Patent No.: US 7,307,684 B2
(45) Date of Patent: Dec. 11, 2007

(54) LIQUID CRYSTAL DISPLAY DEVICE

(75) Inventors: Yong Sung Ham, Anyang-shi (KR);
Yun Bok Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 25 days.

(21) Appl. No.: 11/185,875

(22) Filed: Jul. 21, 2005

(65) Prior Publication Data

US 2005/0253985 A1 Nov. 17, 2005

Related U.S. Application Data

(62) Division of application No. 10/608,561, filed on Jun. 30, 2003, now Pat. No. 6,940,571.

(30) Foreign Application Priority Data

Aug. 28, 2002 (KR) ............................... 2002-51103

(51) Int. Cl.
*G02F 1/1337* (2006.01)
(52) U.S. Cl. ...................... 349/129; 349/106; 349/130
(58) Field of Classification Search ................ 349/129, 349/130, 106
See application file for complete search history.

(56) References Cited

U.S. PATENT DOCUMENTS

| | | | |
|---|---|---|---|
| 4,691,995 A | 9/1987 | Yamazaki et al. | |
| 5,309,264 A | 5/1994 | Lien et al. | |
| 5,608,556 A | 3/1997 | Koma | |
| 5,666,179 A | 9/1997 | Koma | |
| 6,100,953 A | 8/2000 | Kim et al. | |
| 6,704,083 B1 | 3/2004 | Kim et al. | |
| 6,717,637 B1 * | 4/2004 | Yoon et al. | 349/106 |

FOREIGN PATENT DOCUMENTS

| | | |
|---|---|---|
| EP | 0 884 626 A2 | 12/1998 |
| JP | 6-235925 | 8/1994 |
| JP | 8-101395 | 4/1996 |
| JP | 9-61829 | 3/1997 |
| JP | 10-177178 | 6/1998 |
| JP | 10-333157 | 12/1998 |
| JP | 10-333159 | 12/1998 |
| JP | 11-133438 | 5/1999 |
| JP | 11-142864 | 5/1999 |
| JP | 11-248930 | 9/1999 |
| JP | 11-326922 | 11/1999 |
| WO | WO 00/08521 | 2/2000 |

OTHER PUBLICATIONS

Y. Tanaka et al.; "A New Design to Improve Performance and Simplify the Manufacturing Process of High-Quality MVA TFT-LCD Panels"; SID '99 Digest; pp. 206-209.

* cited by examiner

*Primary Examiner*—David Nelms
*Assistant Examiner*—David Chung
(74) *Attorney, Agent, or Firm*—McKenna Long & Aldridge LLP

(57) ABSTRACT

A liquid crystal display (LCD) device is disclosed, in which a hole or groove is formed at the same direction as the axis of polarization of first and second polarizers for improving the luminance, and an electric field inducing window or a dielectric protrusion is formed corresponding to the center of the hole or groove to stabilize the texture of liquid crystal layer.

28 Claims, 14 Drawing Sheets

(a)

(b)

LIQUID CRYSTAL DISPLAY DEVICE

This application is a divisional of prior application Ser. No. 10/608,561, filed Jun. 30, 2003, now U.S. Pat. No. 6,940,571.

This application claims the benefit of the Korean Application No. P2002-51103 filed on Aug. 28, 2002, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device for stabilizing a texture of liquid crystal molecules, and maximizing luminance.

2. Discussion of the Related Art

In recent years, the development of information society increases demands for various display devices, so that many efforts have been made to research and develop various flat display devices such as liquid crystal display (LCD), plasma display panel (PDP), electroluminescent display (ELD), and vacuum fluorescent display (VFD). Some types of the flat display devices are already used as displays of various equipment.

Among the various flat display devices, the liquid crystal display (LCD) device has been most widely used due to its advantageous characteristics of thinness, lightness in weight, and low power consumption, whereby the LCD device has come to replace Cathode Ray Tube (CRT). In addition to the mobile type LCD devices such as a display for notebook computers, LCD devices have been developed for computer monitors and televisions to receive and display broadcasting signals.

Despite various technical developments in the LCD technology, research in improving the picture quality of LCD devices has been in some respects lacking as compared to other features and advantages of the LCD devices. Therefore, in order to use LCD devices in various fields as general displays, it is preferable that the LCD device can implement a high quality picture, such as high resolution and high luminance with a large-sized screen, while still maintaining lightness in weight, thinness, and low power consumption.

The LCD device includes an LCD panel for displaying an image and a driving part for applying a driving signal to the LCD panel. The LCD panel includes first and second glass substrates bonded to each other at a predetermined interval and a liquid crystal layer injected between the first and second glass substrates. The liquid crystal layer is driven by an electric field generated between the first and second glass substrates, thereby controlling light transmittance by the liquid crystal layer. As a result, an image is displayed on the LCD panel.

Among the LCD devices, a Twisted Nematic (TN) mode LCD device, in which longitudinal directions of liquid crystal molecules between the lower and upper substrates are parallel with the lower and upper substrates, has been most generally used. In TN mode, the liquid crystal molecules are spirally twisted with a predetermined pitch.

The TN mode LCD device has characteristics of varying transmittance of light at each gray level depending on viewing angles. Specifically, the transmittance of light is distributed symmetrically in right and left directions of the TN mode LCD device, but asymmetrically in lower and upper directions.

In order to overcome such a problem, a method is proposed to compensate for the viewing angle dependency by dividing pixels into multiple domains with each domain having a different alignment direction of the liquid crystal layer in a Vertical Alignment (VA) mode. In the VA mode, an auxiliary electrode or an electric field inducing window is formed on the upper substrate to distort an electric field, thereby obtaining a wide viewing angle.

A related art LCD device will be explained with reference to the accompanying drawings. FIG. 1 is an enlarged plan view illustrating a related art LCD device, and FIG. 2 is a cross-sectional view illustrating a related art LCD device taken along line I-I' of FIG. 1.

As shown in FIG. 1 and FIG. 2, the related art LCD device includes lower and upper substrates 1 and 10 facing each other, and a liquid crystal layer 16 between the lower and upper substrates 1 and 10.

The lower substrate 1 includes a plurality of gate and data lines 2 and 4 crossing each other to define a plurality of pixel regions. A gate electrode 2a extends from both sides of the gate line 2. The lower substrate 1 also includes a gate insulating layer (not shown); an active region 3 on the gate insulating layer above the gate electrode 2a; a pixel electrode 7 in the pixel region in the same layer as the active region; a source electrode 4a extending from the data line 4 and overlapping one portion of the active region 3; a drain electrode 4b spaced apart from the source electrode 4a and overlapping the other portion of the active region 3 and a predetermined portion of the pixel region; an interlayer insulation film 6 on the entire surface of the lower substrate 1 including the pixel electrode 7; an orientation control electrode 5 on the interlayer insulation film 6 overlapping the periphery of the pixel electrode 7; and a first alignment layer 8 on the lower substrate 1 including the orientation control electrode 5.

The upper substrate 10 includes a black matrix layer (not shown) that prevents light leakage at the regions other than the pixel regions of the lower substrate 1, a color filter layer (not shown) on the upper substrate 10 corresponding to the black matrix layer of the upper substrate 10 and the pixel regions of the lower substrate 1, a common electrode 13 on the color filter layer, the common electrode 13 having an X-shaped orientation control window 14, and a second alignment layer 15 on the upper substrate 10 including the common electrode 13.

Although not shown, first and second polarizing plates are formed on a lower surface of the lower substrate 1 and an upper surface of the upper substrate 10, respectively. The first and second polarizing plates have polarizers crossing each other.

At this time, the orientation control electrode 5 is connected to another orientation control electrode of an adjacent pixel. Also, the orientation control window 14 is used for distorting the vertical electric field formed between the pixel electrode 7 and the common electrode 13.

That is, when the electric field is generated between the pixel electrode 7 of the lower substrate 1 and the common electrode 13 of the upper substrate 10, as indicated by the arrows of FIG. 2, a fringe field is generated by the orientation control window 14 inside the common electrode 13. Thus, liquid crystal molecules are differently oriented at both sides of the orientation control window 14 by the fringe field, thereby compensating a viewing angle.

Also, the liquid crystal layer 16 has a negative dielectric anisotropy. In the. VA mode using the fringe field, if an additional structure for inducing a fringe field (such as a side electrode) is not formed, a texture of liquid crystal molecules varies at each pixel region, thereby deteriorating uniformity of the LCD device.

Meanwhile, as shown in FIG. 3, devices having a liquid crystal layer 16 (FIG. 2) having negative dielectric anisotropy between the lower and upper substrates can have black lines on the screen generated by longitudinal axes of the liquid crystal molecules 21 arranged in parallel to the optical axes of the first and second polarizing plates.

In order to solve such a problem, chiral dopant is added to the negative dielectric anisotropy liquid crystal (vertical alignment liquid crystal with chiral dopant, hereinafter, referred to as VAC) as illustrated in FIG. 4. That is, light is transmitted at the portion where the longitudinal axes of the liquid crystal molecules 21 are arranged in parallel (arrow direction) to the optical axes of the first and second polarizing plates. Thus, luminance is improved as compared with a case using the general liquid crystal layer having the negative dielectric anisotropy. Accordingly, if the general liquid crystal layer having the negative dielectric anisotropy is used, 'A' and 'B' portions of FIG. 3 become black as a result of the liquid crystal molecules arranged parallel to the optical axes of the first and second polarizing plates.

Meanwhile, using the VAC, the liquid crystal molecules are arranged in a twisted structure, as illustrated in FIG. 4 according to helical characteristics of the chiral dopant. Thus, the light is transmitted at 'C' and 'D' portions of FIG. 4, thereby improving luminance.

FIG. 5 illustrates the luminance when a general liquid crystal layer having the negative dielectric anisotropy is used as compared to the luminance when the VAC is used. If the VAC (dotted line) is used for the related art LCD device, luminance is improved as compared with the case using the general liquid crystal layer having the negative dielectric anisotropy without chiral dopant (solid line).

However, the related art LCD device has the following disadvantages.

In the related art LCD device, the orientation control window is formed to obtain the wide viewing angle, whereby the texture of the liquid crystal molecules is stabilized. However, in case of using the liquid crystal layer having the negative dielectric anisotropy, luminance is deteriorated because the liquid crystal molecules are arranged in parallel with the first and second the polarizers.

In case of using the VAC having the liquid crystal layer of the twisted structure, luminance is improved. However, it is hard to maximize luminance due to the thin color filter layer on the upper substrate.

SUMMARY OF THE INVENTION

Accordingly, the present invention is directed to a liquid crystal display (LCD) device that substantially obviates one or more problems due to limitations and disadvantages of the related art.

An advantage of the present invention is to provide to an LCD device in which a hole is formed in the same direction as those of first and second polarizers, and an electric field inducing window or a dielectric protrusion is formed at the center of the hole, thereby maximizing the luminance of the LCD device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device includes first and second substrates; gate and data lines crossing each other to define a pixel region on the first substrate; a pixel electrode on the pixel region; a color filter layer on the second substrate, the color filter layer having a hole; a common electrode on the color filter layer; a liquid crystal layer between the first and second substrates; and first and second polarizers on the first and second substrates, a direction of the polarizer having same direction of the hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In The Drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

In LCD devices according to the illustrated embodiments of the present invention, a hole or groove is formed inside a unit pixel region in parallel with a polarizer, a dielectric protrusion or an electric field inducing window is formed on the center of the hole or groove, and a liquid crystal layer having chiral dopant is formed, thereby maximizing luminance.

The LCD devices according to the illustrated embodiments of the present invention, in which the dielectric protrusion or the electric field inducing window is formed inside the unit pixel region, will be described as follows.

Figure 1:
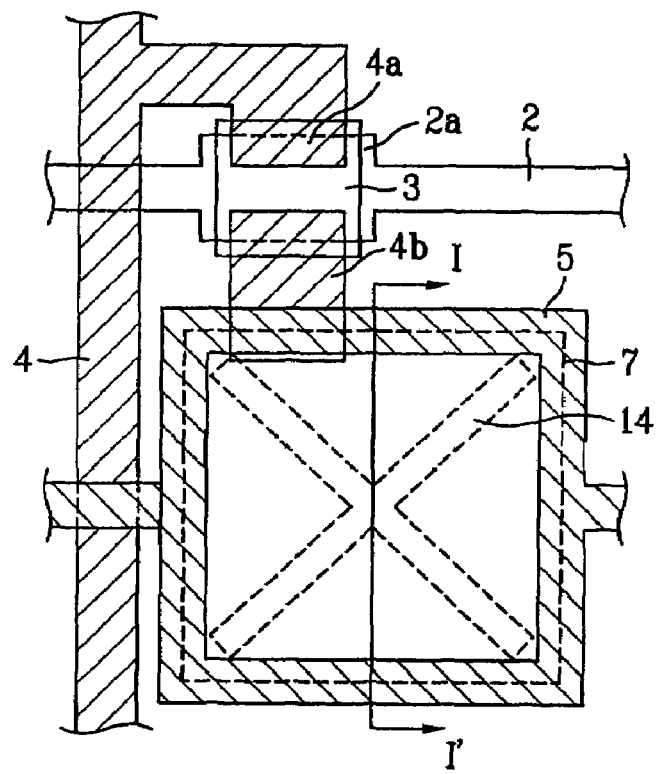
FIG. 1 is an enlarged plan view illustrating a unit pixel of a related art LCD device.
Figure 2:
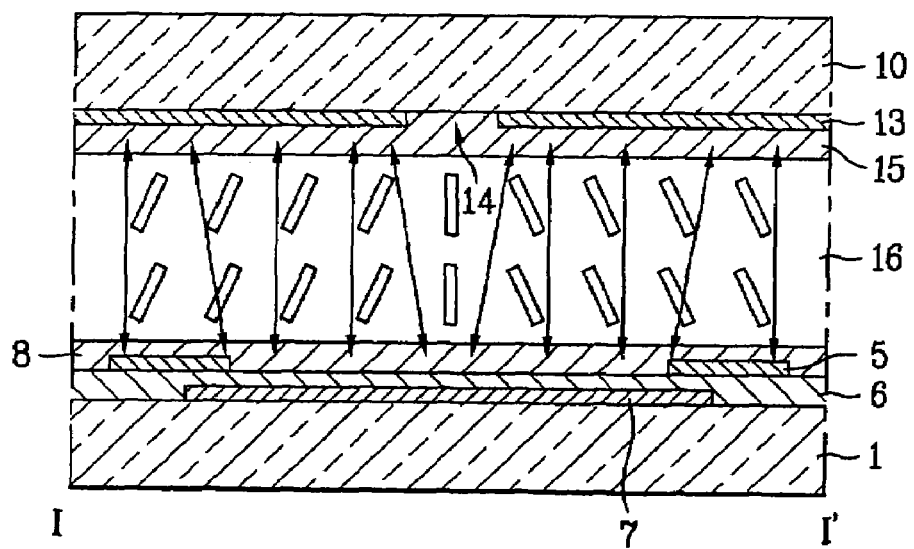
FIG. 2 is a cross-sectional view illustrating a unit pixel taken along line I-I' of a FIG. I in a related art LCD device.
Figure 3:
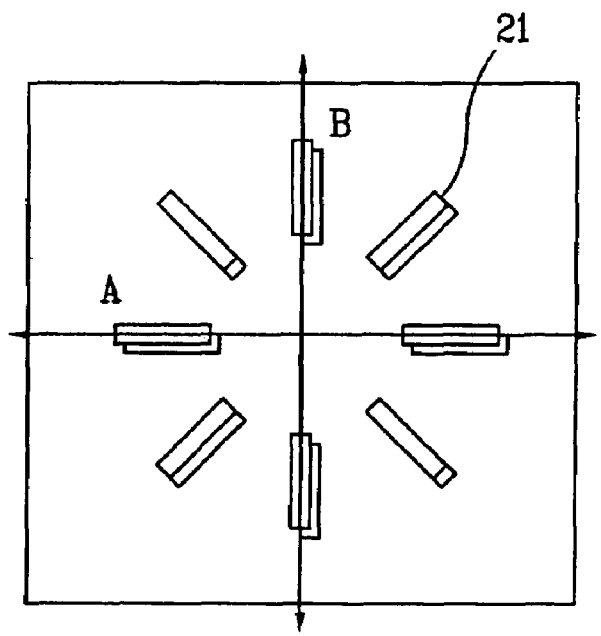
FIG. 3 is a plan view illustrating an orientation of liquid crystal layer having negative dielectric anisotropy in a related art LCD device.
Figure 4:
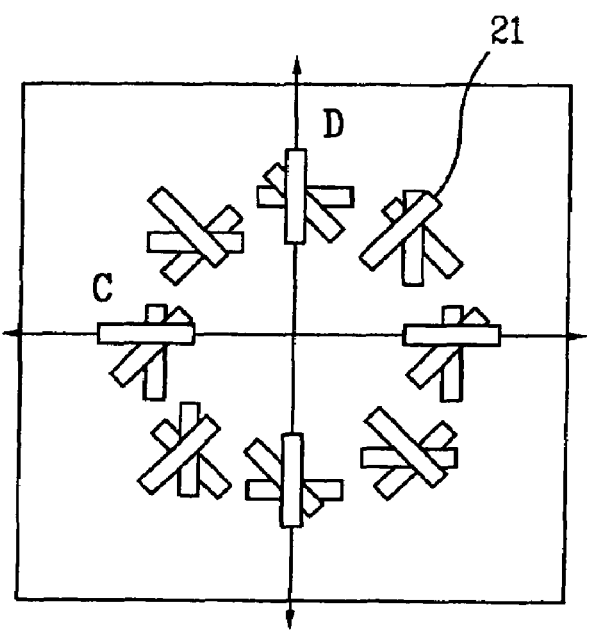
FIG. 4 is a plan view illustrating an orientation of liquid crystal layer having chiral dopant in a related art LCD device.
Figure 5:
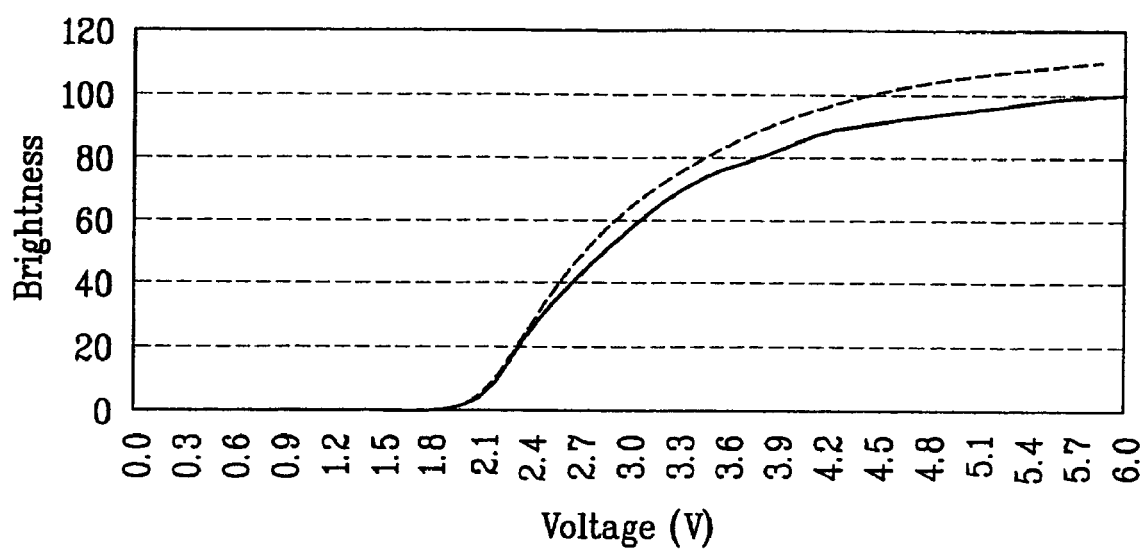
FIG. 5 is a graph illustrating luminance using a liquid crystal having negative dielectric anisotropy with a chiral dopant and without a chiral dopant according to voltage.
Figure 6:
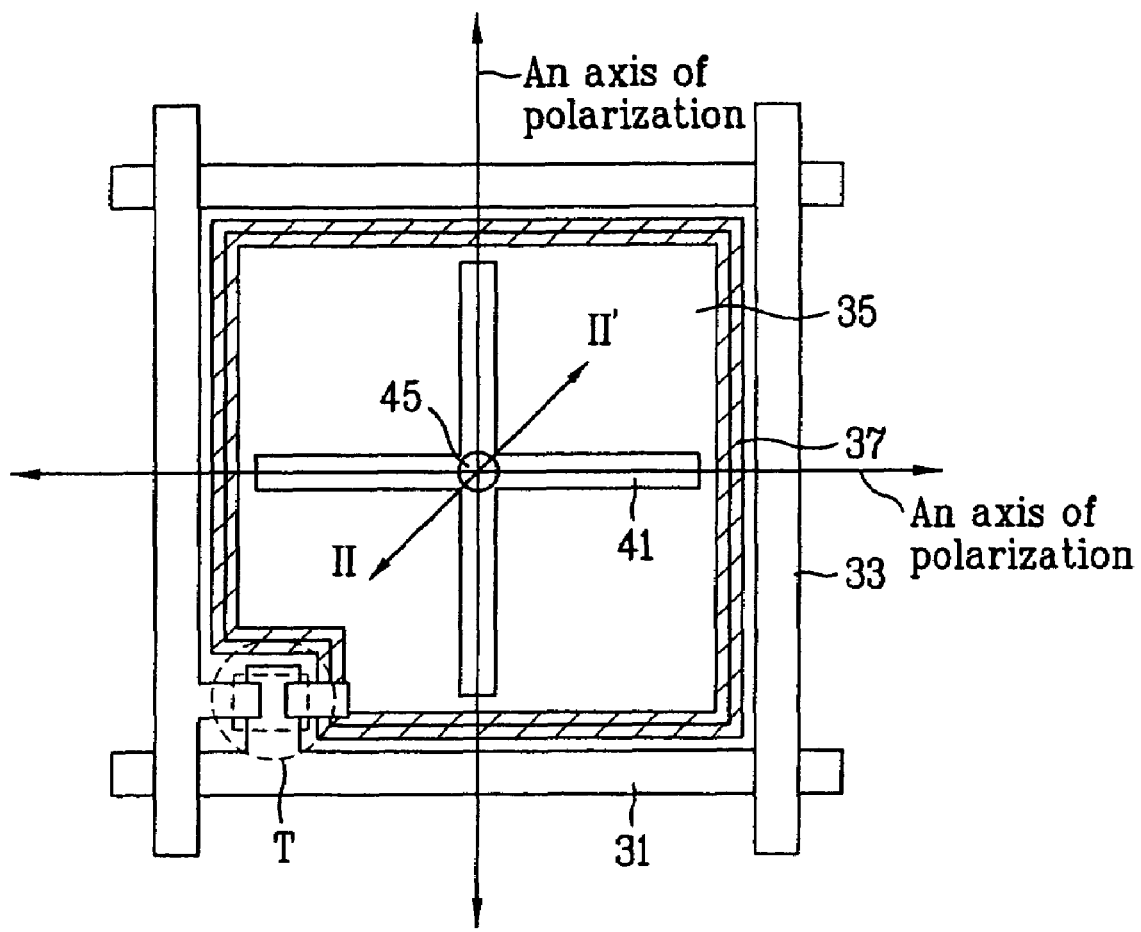
FIG. 6 is an enlarged plan view illustrating a unit pixel of an LCD device according to a first embodiment of the present invention.
Figure 7:
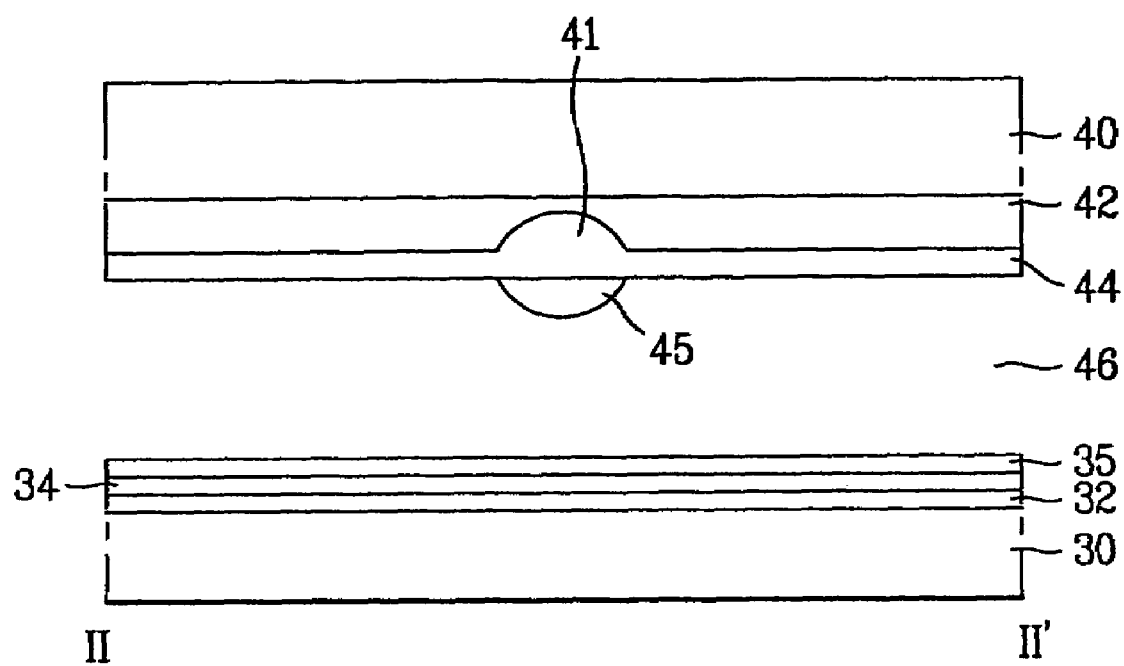
FIG. 7 is a cross-sectional view illustrating a unit pixel taken along line II-II' of FIG. 6 according to the present invention.

FIG. 6 is an enlarged plan view illustrating a unit pixel region of an LCD device according to a first embodiment of the present invention, and FIG. 7 is a cross-sectional view illustrating the unit pixel region taken along line II-II' of FIG. 6 in an LCD device according to the first embodiment of the present invention.

As illustrated in FIG. 6 and FIG. 7, the LCD device according to the first embodiment of the present invention includes lower and upper substrates 30 and 40 facing each other with a predetermined interval therebetween. A plurality of gate and data lines 31 and 33, a plurality of thin film transistors T, a pixel electrode 35, a common auxiliary electrode 37, a gate insulating layer 32, and a passivation layer 34 are on the lower substrate 30. A black matrix layer (not shown), a color filter layer 42, a common electrode 44, a dielectric protrusion 45 are on the upper substrate 40. A liquid crystal layer 46 fills the predetermined interval between the lower and upper substrates 30 and 40.

The plurality of gate lines 31 are formed on the lower substrate 30 substantially perpendicular to the plurality of data lines 33 for defining a plurality of pixel regions. Then, the plurality of thin film transistors T are formed at crossing points of the plurality of gate and data lines 31 and 33, and each pixel electrode 35 is formed on the pixel region. Also, the common auxiliary electrode 37 is formed on the same layer as the gate line 31 or the data line 33 overlapping the periphery of the pixel electrode, and the gate insulating layer 32 is formed on the entire surface of the lower substrate 30, including the gate lines 31. The passivation layer 34 is formed on the entire surface of the lower substrate 30, including the data lines 33.

The black matrix layer (not shown) is formed on the upper substrate 40 in areas corresponding to regions of the lower substrate 30 other than the pixel regions. The color filter layer 42 having a hole or groove 41 in the pixel region partially overlaps with the black matrix layer, and the common electrode 44 is formed on the entire surface of the upper substrate 40, including the color filter layer 42. Also, the dielectric protrusion 45 is formed on the common electrode 44 at the center of the hole or groove 41, and the liquid crystal layer 46 is formed between the lower and upper substrates 30 and 40.

Although not shown, an orientation layer is formed on the entire surface of at least one of the lower and upper substrates 30 and 40 to determine an initial alignment of the liquid crystal layer 46. Furthermore, first and second polarizers are formed on an upper surface of the upper substrate 40 and a lower surface of the lower substrate 30, the first and second polarizers having axes of polarization crossing each other.

Preferably, the liquid crystal layer 46 has a negative dielectric anisotropy. Also, the liquid crystal layer 46 includes vertical alignment liquid crystal with chiral dopant (hereinafter, referred to as VAC). That is, light is transmitted at a portion where longitudinal axes of the liquid crystal molecules are parallel with the first and second polarizers, whereby luminance is improved as compared with using general liquid crystal layer of negative dielectric anisotropy without chiral dopant.

The hole or groove 41 in the pixel region is formed in the same direction as those of the first and second polarizers, so that light transmittance is improved, thereby maximizing luminance.

Figure 8A:
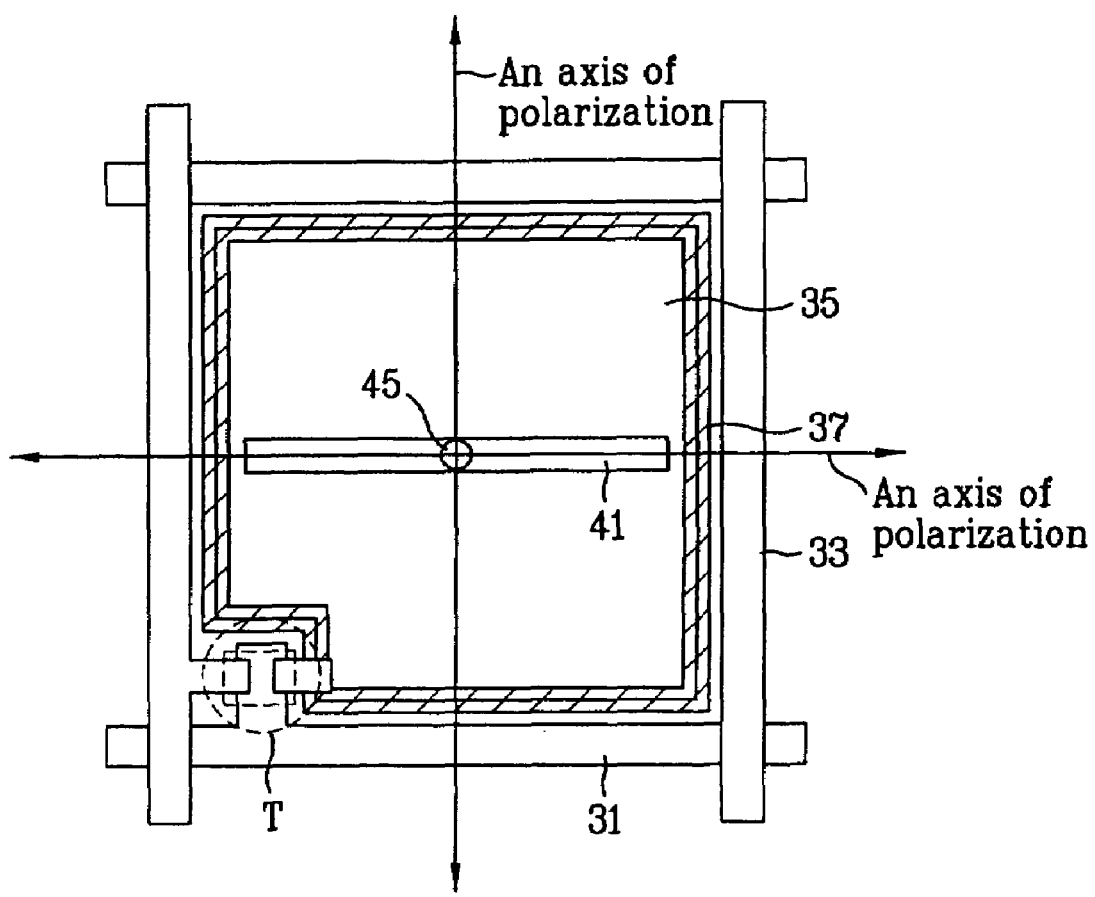
FIGS. 8A, 8B, 9A, 9B and 9C are enlarged plan views illustrating a unit pixel having a hole in an LCD device according to the first embodiment of the present invention.
Figure 8B:
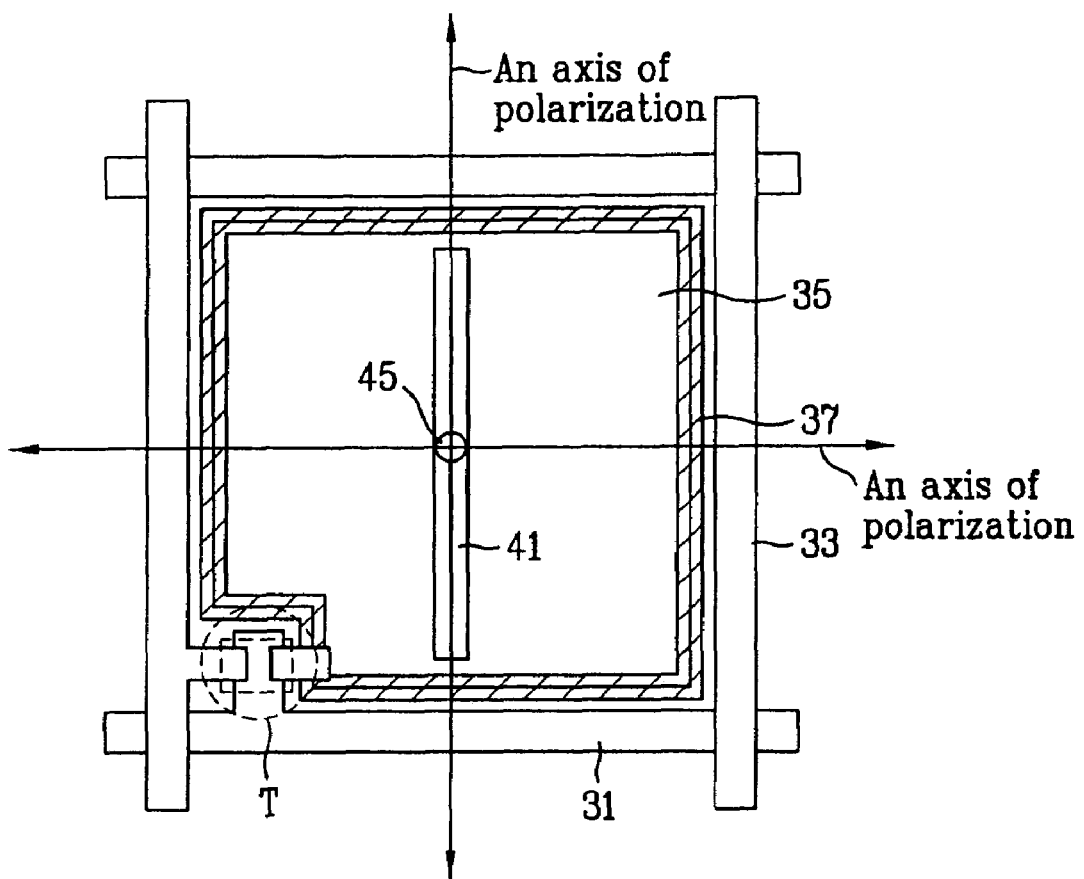

That is, if axes of polarization of the first and second polarizers are parallel with the length and the width of the lower and upper substrates, the hole or groove may be formed in a cross-shape corresponding to the directions of the axes of polarization. Optionally, as illustrated in FIG. 8A or FIG. 8B, the hole or groove may be formed horizontally or vertically in the unit pixel region (in the context of the figure). Also, the hole or groove may be formed in the direction of the axes of polarization.

Figure 9A:
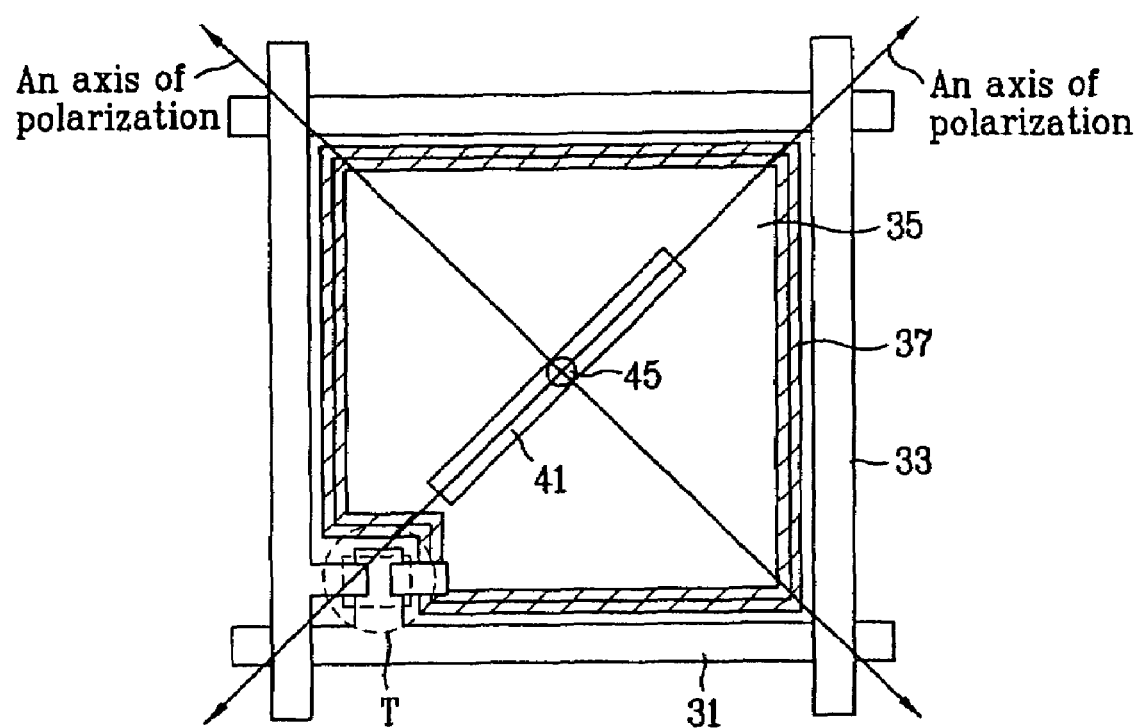
Figure 9B:
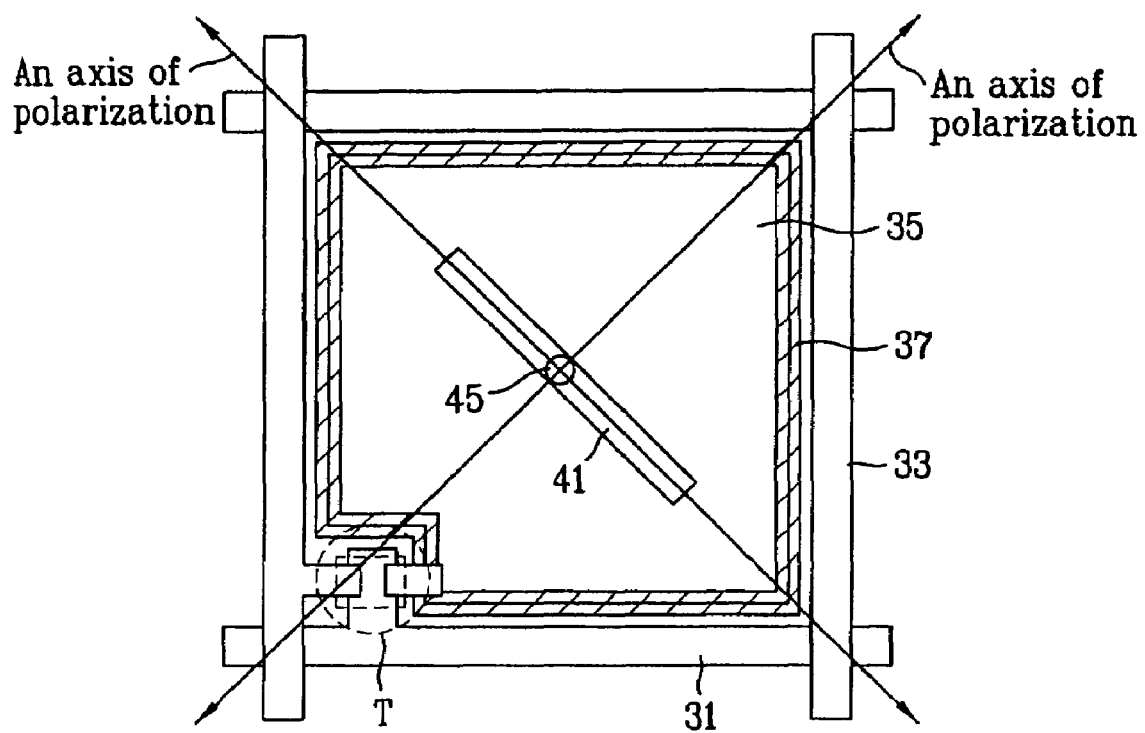
Figure 9C:
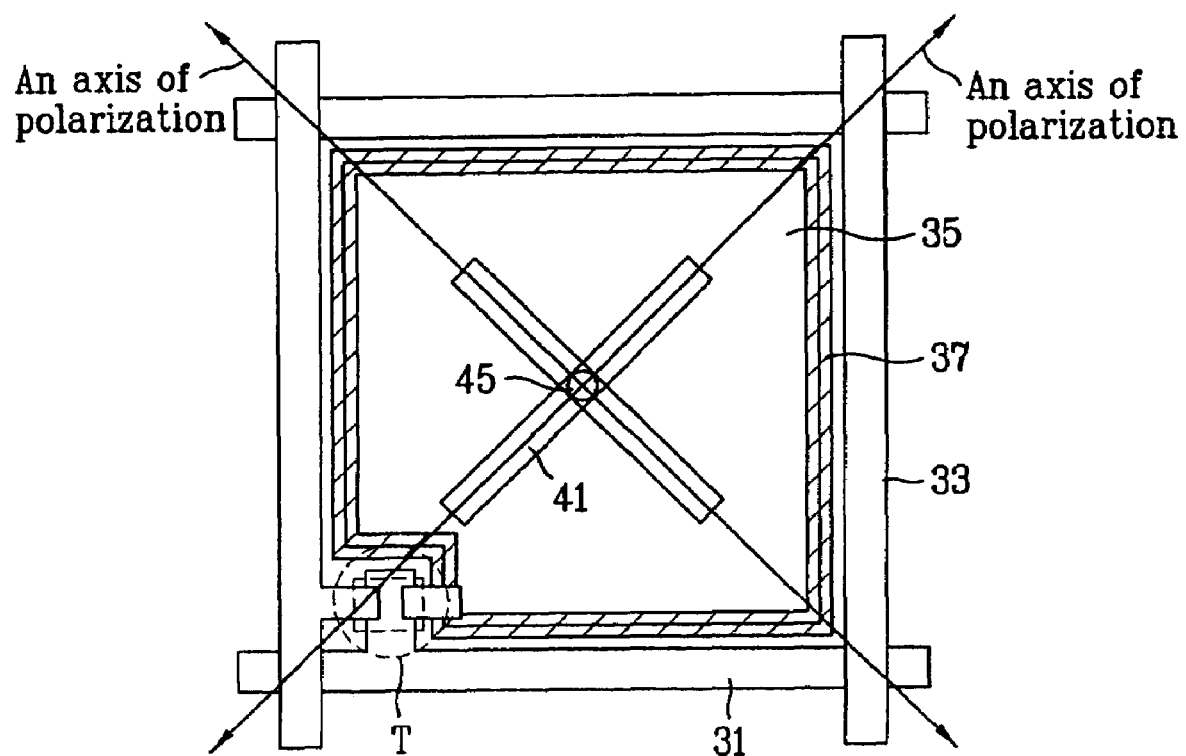

Referring to FIG. 9A to FIG. 9C, if the hole or groove is formed diagonally or in X-shape inside the unit pixel region, the first and second polarizers are diagonally formed to the lower and upper substrates 30 and 40. In addition, the shape of the hole or groove may vary in the direction of the polarizers.

At this time, the hole or groove 41 is formed by etching the color filter layer 42. That is, the color filter layer 42 may be over-etched as shown in FIG. 10(a), or may be removed as shown in FIG. 10(b).

Figure 11:
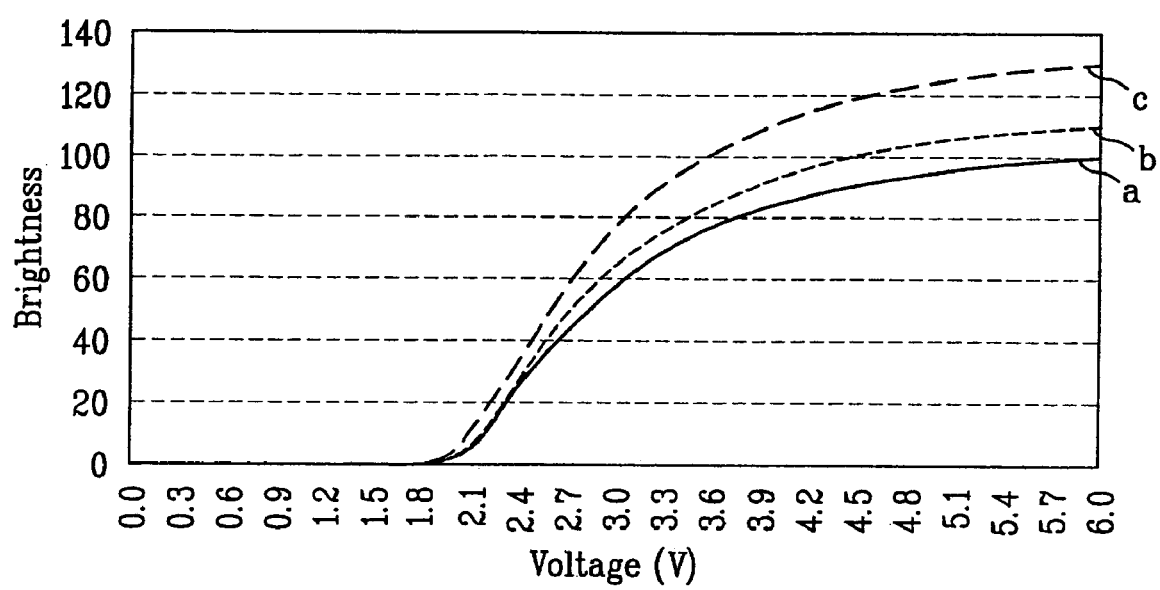
FIG. 11 is a graph comparing the luminance of an LCD device according to the first embodiment of the present invention with the luminance of a related art LCD device.

In the LCD device according to the first embodiment of the present invention, the color filter layer 42 may be over-etched or removed to form the hole or groove 41, whereby light is transmitted through the hole or groove 41. Thus, luminance is improved since the light transmittance is irradiated in the hole or groove, as shown in FIG. 11.

The LCD device according to the first embodiment of the present invention uses the hole or groove and the VAC liquid crystal layer. Referring to FIG. 11, the luminance (c) of the LCD device using both the hole or groove and the VAC liquid crystal layer increases as voltage intensity applied to the pixel electrode increases, in comparison with a related art LCD device having liquid crystal layer without chiral dopant (a) of FIG. 11 or a related art LCD device using the VAC liquid crystal layer of FIG. 11.

Meanwhile, the unit pixel region is divided into two domains according to the hole or groove 41 horizontally formed inside the unit pixel region, and then divided again according to the hole or groove 41 vertically formed inside the pixel region, thereby forming four domain regions in the unit pixel region. In this case, a fringe field is generated by the hole or groove 41 and the common auxiliary electrode 37, whereby an electric field generated in the lower substrate spreads to the circumference of the pixel region.

The texture of the liquid crystal layer is stabilized by the electric field in the circumference of the pixel electrode, remaining parts of the unit pixel region except the hole or groove 41. However, if the hole or groove 41 is wide, the texture of the liquid crystal may be caused to be unstable by the hole or groove 41.

Accordingly, in the LCD device according to the first embodiment of the present invention, the hole or groove 41 is formed in the pixel region, and the dielectric protrusion 45 is formed at the center of the hole or groove 41, thereby stabilizing the texture of the liquid crystal layer.

Next, an overcoat layer (not shown) may be formed on the color filter layer 22 for planarizing the upper substrate, and the common electrode 42 may be formed on the overcoat layer. In this case, even though it is hard to obtain electric field distortion effect by the hole or groove 41, it is possible to improve luminance.

It will be apparent to those skilled in the art that various modifications and variations of the gate line 31, the data line 33, the gate insulating layer 32, the black matrix layer and the color filter layer 42 can be made in the present invention. Thus, it is intended that the present invention covers the modifications and variations of this invention provided they come within the scope of the appended claims and their equivalents.

As mentioned above, the LCD device according to the first embodiment of the present invention is formed such that the hole or groove 41 is formed inside the unit pixel region TN in the same direction as that of the polarizer to improve the luminance, and the dielectric protrusion 45 is formed at the center of the hole or groove 41 to stabilize the texture of the liquid crystal layer.

In an LCD device according to the second embodiment of the present invention, a hole or groove is formed in a pixel region on a color filter layer, and then an electric field inducing window is formed in the center of the hole or groove of the color filter layer.

Figure 10:
FIG. 10 is a cross-sectional view illustrating an etching process of a color filter layer.
Figure 10:
Figure 12:
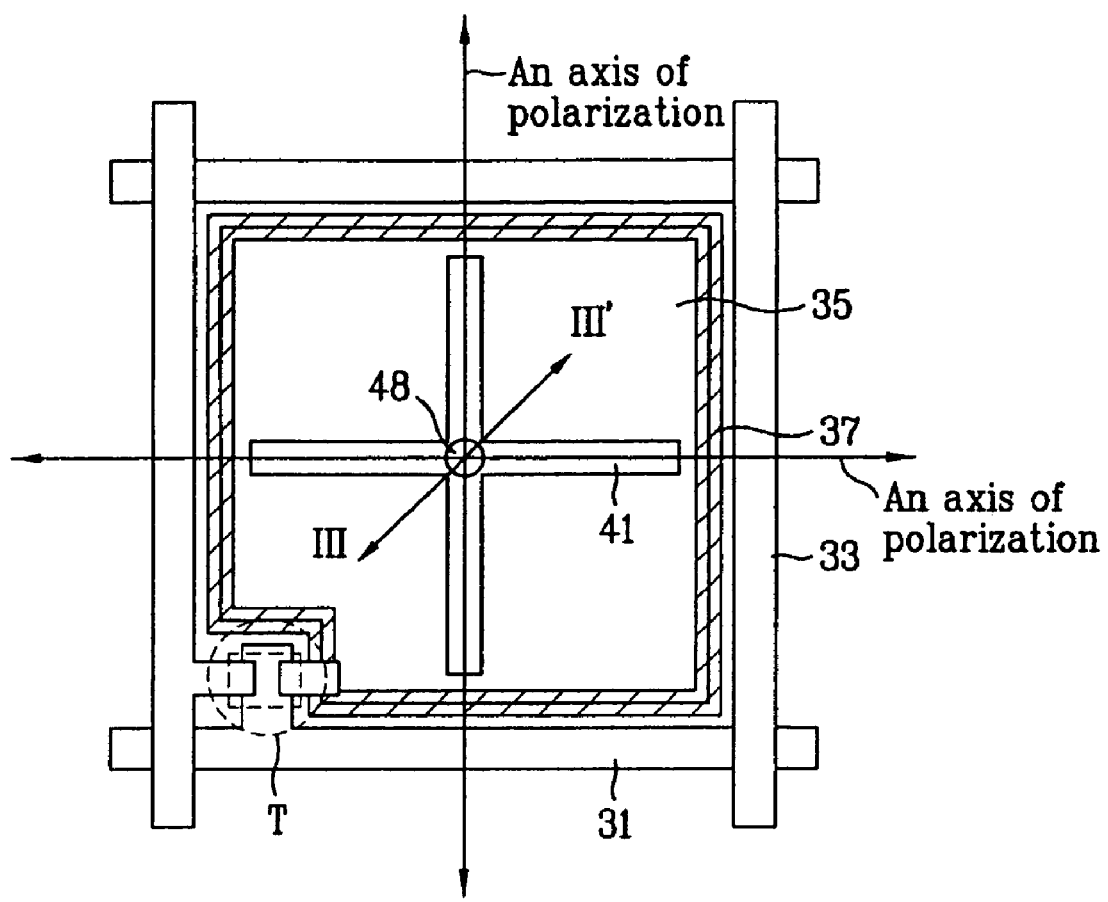
FIG. 12 is an enlarged plan view illustrating a unit pixel of an LCD device according to a second embodiment of the present invention.
Figure 13:
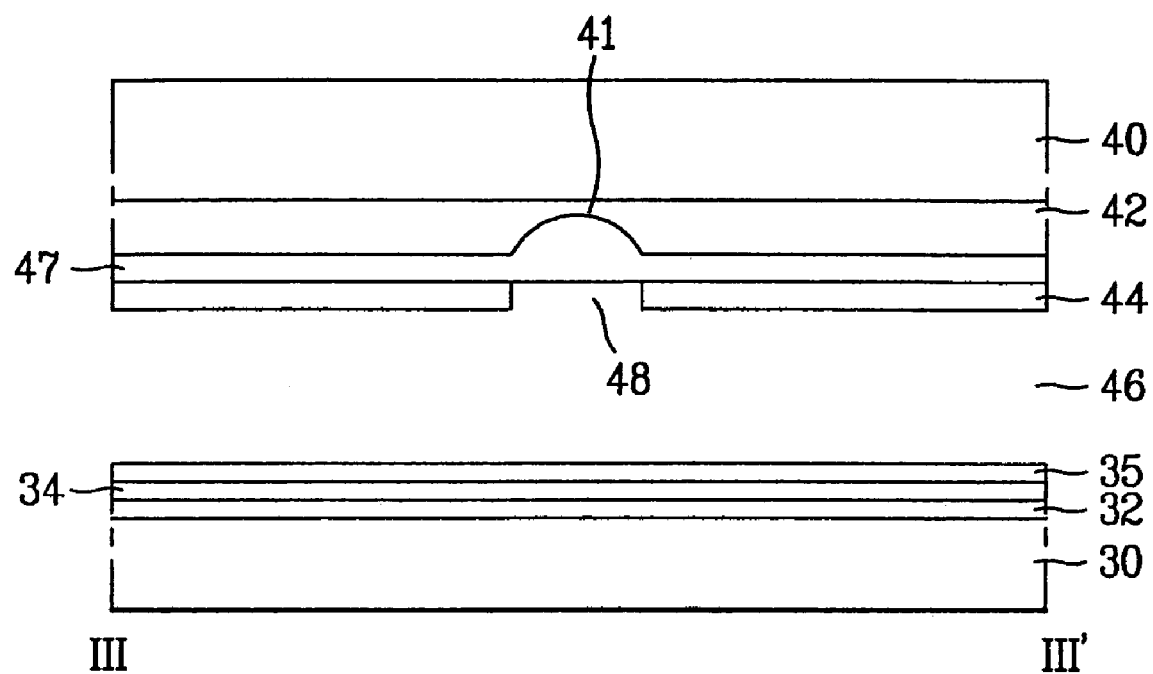
FIG. 13 is a cross-sectional view illustrating a unit pixel taken along line III-III' of FIG. 10 according to the present invention.

FIG. 12 is an enlarged plan view illustrating a unit pixel region of an LCD device according to the second embodiment of the present invention, and FIG. 13 is a cross-sectional view illustrating a unit pixel region taken along line III-III' of FIG. 10 in an LCD device according to the second embodiment of the present invention.

As shown in FIG. 12 and FIG. 13, the LCD device according to the second embodiment of the present invention includes lower and upper substrates 30 and 40 facing each and spaced apart by a predetermined interval. The lower substrate 30 includes a plurality of gate and data lines 31 and 33, a plurality of thin film transistors T, a pixel electrode 35, a common auxiliary electrode 37, a gate insulating layer 32, and a passivation layer 34. The upper substrate 40 includes a black matrix layer, a color filter layer 42, an overcoat layer 47, and a common electrode 44. A liquid crystal layer 46 is interposed between the lower and upper substrates 30 and 40 in the predetermined interval.

The plurality of gate lines 31 are formed on the lower substrate 30 substantially perpendicular with the plurality of data lines 33, thereby forming a plurality of pixel regions. Then, the thin film transistor T is formed at each crossing point of the gate and data lines 31 and 33, and each pixel electrode 35 is formed in the pixel region. The common auxiliary electrode 37 is formed on the same layer as that of the gate line 31 or the data line 33 overlapping the periphery of the pixel electrode, and the gate insulating layer 32 is formed on the entire surface of the lower substrate 30 including the gate lines 31. Also, the passivation layer 34 is formed on the entire surface of the lower substrate 30 including the data lines 33.

Next, the black matrix layer is formed on the upper substrate 40 corresponding to regions of the lower substrate 30 except the pixel regions, and the color filter layer 42 is formed partially overlapping the black matrix layer, the color filter layer 42 having a hole or groove 41 in the pixel region. Then, the overcoat layer is formed on the entire surface of the upper substrate 40 including the color filter layer 42, and the common electrode 44 is formed on the entire surface of the upper substrate 40 including the overcoat layer, the common electrode 44 having an electric field inducing window 48 in the center of the hole or groove 41. After that, the liquid crystal layer 46 is formed between the lower and upper substrates 30 and 40.

Although not shown, an orientation layer is formed on the entire surface of at least one of the lower and upper substrates 30 and 40 to determine an initial alignment of the liquid crystal layer 46. Furthermore, first and second polarizers are formed on an upper surface of the upper substrate 40 and a lower surface of the lower substrate 30, respectively, the first and second polarizers crossing each other.

The liquid crystal layer 46 may have a negative dielectric anisotropy. Also, the liquid crystal layer 46 includes vertical alignment liquid crystal with chiral dopant (hereinafter, referred to as VAC).

The overcoat layer is formed to easily form the electric field inducing window 48 of the common electrode 44 by planarizing the color filter layer 42. That is, in forming the electric field inducing window 48 by etching the common electrode 44 in a region corresponding to the center of the hole or groove 41 without forming the overcoat layer, there may be problems in etching the common electrode 44.

The LCD device according to the second embodiment of the present invention is the same as the LCD device according to the first embodiment of the present invention except that the electric field inducing window (reference number 48 of FIG. 13) is formed on the upper substrate 40 instead of the dielectric protrusion (reference number 45 of FIG. 6) on the upper substrate. Thus, the same reference numbers will be used throughout the drawings to refer to the same except the electric field inducing window 48 on the upper substrate 40.

In order to easily form the aforementioned electric field inducing window 48, the overcoat layer is further formed to planarize the color filter layer 42.

Meanwhile, the hole or groove 41 is planarized by the overcoat layer, and the common electrode 44 is formed on the overcoat layer, so that it is difficult to distort the electric field by the hole or groove 41. That is, the hole or groove 41 is not for controlling the liquid crystal layer 46, but for improving luminance by controlling light transmittance on the color filter layer 42 according to an area of the hole or groove.

Meanwhile, the electric field inducing window generates a fringe field with common auxiliary electrode overlapping the pixel electrode at the periphery of the pixel region. Thus, an electric field spreads to the circumference of the pixel region, thereby stabilizing the texture of the liquid crystal layer. At this time, the electric field inducing window 48 may be larger than the hole or groove 41 in the center of the pixel region.

In the LCD device according to the second embodiment of the present invention, the hole or groove 41 is formed in the same direction as that of the polarizer being crossed on the upper substrate 40 so as to improve the luminance. Also, the electric field inducing window 48 is formed in the center of the pixel region to stabilize the texture of the liquid crystal layer.

As mentioned above, the LCD device according to the present invention has the following advantages.

In the LCD device according to the present invention, the hole or groove is formed inside the pixel region, and chiral dopant is added to the liquid crystal layer, so that light transmittance is improved, thereby maximizing luminance.

Also, the dielectric protrusion or the electric field inducing window is formed in the center of the pixel region to stabilize the texture of the liquid crystal layer, thereby obtaining a uniform image.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD device comprising:
   first and second substrates;
   gate and data lines crossing each other to define a pixel region on the first substrate;
   a pixel electrode on the pixel region;
   a color filter layer on the second substrate, the color filter layer having a hole;
   an overcoat layer on the color filter layer, the overcoat layer having a planarizing surface on the hole;
   a common electrode on the planarizing surface of the overcoat layer;
   a liquid crystal layer between the first and second substrates;
   first and second polarizers on the first and second substrates, a direction of the polarizer having same direction of the hole; and
   an electric field inducing window on the center of the hole, the electric field inducing window being formed in the common electrode and on the planarizing surface of the overcoat layer.

2. The device of claim 1, wherein the liquid crystal layer has a negative dielectric anisotropy.

3. The device of claim 2, wherein the liquid crystal layer further includes chiral dopant.

4. The device of claim 1, wherein the hole has a shape one of a cross-shape, horizontally, vertically, diagonally and in X-shape.

5. The device of claim 1, wherein the hole is formed by etching the color filter layer.

6. The device of claim 1, wherein the pixel electrode is overlapped with the data line.

7. The device of claim 1, further comprising a common auxiliary electrode at the periphery of the pixel electrode.

8. The device of claim 7, wherein the common auxiliary electrode overlaps with the pixel electrode.

9. A liquid crystal display device, comprising:
   first and second substrates facing each other, at least one of the first and second substrates having a polarizer on an external surface thereof, wherein the polarizer has a first axis of polarization with a first direction;
   gate and data lines crossing each other to define at least one pixel region on a surface of the first substrate;
   a pixel electrode on the pixel region;
   a color filter layer on a surface of the second substrate facing the first substrate, the color filter layer having a groove therein, wherein a long side of the groove extends in the first direction;
   an overcoat layer on the color filter layer, the overcoat layer having a planarizing surface on the groove;
   a common electrode on the planarizing surface of the overcoat layer;
   a liquid crystal layer between the first and second substrates; and
   an electric field inducing window corresponding to the center of the groove, the electric field inducing window being formed in the common electrode and on the planarizing surface of the overcoat layer.

10. The device of claim 9, wherein the pixel electrode is overlapped with the data line.

11. The device of claim 9, further comprising a common auxiliary electrode at the periphery of the pixel electrode.

12. The device of claim 11, wherein the common auxiliary electrode overlaps with the pixel electrode.

13. The device of claim 9, wherein the other of the first and second substrates has an additional polarizer on an external surface thereof, wherein the additional polarizer has a second axis of polarization in a second direction.

14. The device of claim 13, wherein the first direction and second direction are substantially parallel.

15. The device of claim 13, wherein the first direction and the second direction are substantially perpendicular.

16. The device of claim 13, wherein the color filter layer has an additional groove, wherein a long side of the additional groove extends in the second direction.

17. The device of claim 16, wherein the groove and the additional groove overlap.

18. The device of claim 17, wherein the groove and the additional groove overlap in a cross shape.

19. The device of claim 13, wherein the first direction is substantially parallel to the data lines and the second direction is substantially parallel to the gate lines.

20. The device of claim 13, wherein the first direction is substantially parallel to the gate lines and the second direction is substantially parallel to the data lines.

21. The device of claim 13, wherein the first direction is not parallel to the data lines or the gate lines and the second direction is not parallel to the gate lines or the data lines.

22. The device of claim 9, wherein the liquid crystal layer has a negative dielectric anisotropy.

23. The device of claim 22, wherein the liquid crystal layer further includes chiral dopant.

24. The device of claim 9, wherein the first direction is substantially parallel to the data lines.

25. The device of claim 9, wherein the first direction is substantially parallel to the gate lines.

26. The device of claim 9, wherein the first direction is at an angle with respect to the data lines.

27. The device of claim 9, wherein the first direction is not parallel to the gate lines or the data lines.

28. The device of claim 9, wherein the groove is formed by etching the color filter layer.

* * * * *